United States Patent
Cabrera et al.

(10) Patent No.: US 7,899,047 B2
(45) Date of Patent: *Mar. 1, 2011

(54) VIRTUAL NETWORK WITH ADAPTIVE DISPATCHER

(75) Inventors: Luis F. Cabrera, Bellevue, WA (US); Erik B. Christensen, Seattle, WA (US); Giovanni M. Della-Libera, Seattle, WA (US); Christopher G. Kaler, Sammamish, WA (US); David E. Levin, Redmond, WA (US); Bradford H. Lovering, Seattle, WA (US); Steven E. Lucco, Bellevue, WA (US); Stephen J. Millet, Edmonds, WA (US); John P. Shewchuk, Redmond, WA (US); Robert S. Wahbe, Seattle, WA (US); David A. Wortendyke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 627 days.

This patent is subject to a terminal disclaimer.

(21) Appl. No.: 11/838,161

(22) Filed: Aug. 13, 2007

(65) Prior Publication Data

US 2009/0046726 A1 Feb. 19, 2009

Related U.S. Application Data

(63) Continuation of application No. 09/993,656, filed on Nov. 27, 2001, now Pat. No. 7,257,817.

(51) Int. Cl.
*H04L 12/56* (2006.01)

(52) U.S. Cl. .................... 370/389; 370/392; 370/401; 709/245; 709/246

(58) Field of Classification Search ................ 370/389, 370/392, 400, 401, 409, 469; 709/236, 245, 709/246

See application file for complete search history.

(56) References Cited

U.S. PATENT DOCUMENTS 4,953,210 A    8/1990   McGlynn et al.

(Continued)

FOREIGN PATENT DOCUMENTS

EP    0715246    6/1996

(Continued)

OTHER PUBLICATIONS

Conference—Schwartau, "Proceedings of International Conference Virus Bulletin", Date Sep. 9-10, 1993, Location Amsterdam, Publication Date 1993, UK.

(Continued)

*Primary Examiner*—Pankaj Kumar
*Assistant Examiner*—Duc T Duong
(74) *Attorney, Agent, or Firm*—Workman Nydegger

(57) ABSTRACT

Methods and systems for providing a virtual network are disclosed. At least one layer of abstraction is created between network service applications and conventional network protocols by inserting an adaptive dispatcher between applications and network transport services on each machine in a network. The message protocol in the virtual network is extensible, allowing application programs to create new headers within any message as needed. The adaptive dispatcher contains handlers that route and dispatch messages within the virtual network based on arbitrary content within each message, including any combination of headers and/or data content. Each device on the virtual network has a virtual address to which messages are directed, allowing devices to move within the network without reconfiguring routing tables. Handlers may be automatically created when an event meeting predefined criteria occurs, including the non-occurrence of a condition, making the virtual network self-healing and adaptive to reconfiguration.

18 Claims, 8 Drawing Sheets

U.S. PATENT DOCUMENTS

| | | | |
|---|---|---|---|
| 5,067,104 A | 11/1991 | Krishnakumar et al. | |
| 5,224,098 A | 6/1993 | Bird et al. | |
| 5,438,508 A | 8/1995 | Wyman | |
| 5,499,343 A | 3/1996 | Pettus | |
| 5,509,000 A | 4/1996 | Oberlander | |
| 5,608,551 A | 3/1997 | Biles et al. | |
| 5,680,551 A | 10/1997 | Martino, II | |
| 5,761,477 A | 6/1998 | Wahbe et al. | |
| 5,862,411 A | 1/1999 | Kay et al. | |
| 5,903,882 A | 5/1999 | Asay et al. | |
| 5,917,912 A | 6/1999 | Ginter et al. | |
| 5,935,219 A | 8/1999 | Holmes | |
| 5,968,176 A | 10/1999 | Nessett et al. | |
| 5,974,416 A | 10/1999 | Anand et al. | |
| 5,978,836 A | 11/1999 | Ouchi | |
| 6,006,259 A | 12/1999 | Adelman et al. | |
| 6,026,441 A | 2/2000 | Ronen | |
| 6,047,324 A | 4/2000 | Ford et al. | |
| 6,073,242 A | 6/2000 | Hardy et al. | |
| 6,119,171 A | 9/2000 | Alkhatib | |
| 6,122,363 A | 9/2000 | Friedlander et al. | |
| 6,144,961 A | 11/2000 | de la Salle | |
| 6,151,618 A | 11/2000 | Wahbe et al. | |
| 6,158,010 A | 12/2000 | Moriconi et al. | |
| 6,167,513 A | 12/2000 | Inoue et al. | |
| 6,199,112 B1 | 3/2001 | Wilson | |
| 6,209,124 B1 | 3/2001 | Vermeire et al. | |
| 6,216,231 B1 | 4/2001 | Stubblebine | |
| 6,219,790 B1 | 4/2001 | Lloyd et al. | |
| 6,223,619 B1 | 5/2001 | Shibata et al. | |
| 6,233,619 B1 | 5/2001 | Narisi et al. | |
| 6,243,749 B1 | 6/2001 | Sitaraman et al. | |
| 6,304,913 B1 | 10/2001 | Rune | |
| 6,351,748 B1 | 2/2002 | Deen et al. | |
| 6,356,920 B1 | 3/2002 | Vandersluis | |
| 6,392,997 B1 * | 5/2002 | Chen | 370/252 |
| 6,393,456 B1 | 5/2002 | Ambler et al. | |
| 6,405,212 B1 | 6/2002 | Samu et al. | |
| 6,405,337 B1 | 6/2002 | Grohn et al. | |
| 6,408,342 B1 | 6/2002 | Moore et al. | |
| 6,446,113 B1 | 9/2002 | Ozzie et al. | |
| 6,449,638 B1 | 9/2002 | Wecker et al. | |
| 6,453,356 B1 | 9/2002 | Sheard et al. | |
| 6,466,971 B1 | 10/2002 | Humpleman et al. | |
| 6,477,580 B1 | 11/2002 | Bowman-Amuah | |
| 6,487,552 B1 | 11/2002 | Lei et al. | |
| 6,496,849 B1 | 12/2002 | Hanson et al. | |
| 6,505,233 B1 | 1/2003 | Hanson et al. | |
| 6,505,254 B1 | 1/2003 | Johnson et al. | |
| 6,507,823 B1 | 1/2003 | Nel | |
| 6,507,865 B1 | 1/2003 | Hanson et al. | |
| 6,522,631 B2 | 2/2003 | Rosborough et al. | |
| 6,523,063 B1 | 2/2003 | Miller et al. | |
| 6,532,213 B1 | 3/2003 | Chiussi et al. | |
| 6,532,455 B1 | 3/2003 | Martin et al. | |
| 6,546,419 B1 | 4/2003 | Humpleman et al. | |
| 6,571,236 B1 | 5/2003 | Ruppelt | |
| 6,578,066 B1 | 6/2003 | Logan et al. | |
| 6,581,060 B1 | 6/2003 | Choy | |
| 6,601,171 B1 | 7/2003 | Carter et al. | |
| 6,601,189 B1 | 7/2003 | Edwards et al. | |
| 6,615,258 B1 | 9/2003 | Barry et al. | |
| 6,618,825 B1 | 9/2003 | Shaw | |
| 6,654,344 B1 | 11/2003 | Toporek et al. | |
| 6,665,657 B1 | 12/2003 | Dibachi | |
| 6,667,974 B1 | 12/2003 | Shigeta | |
| 6,675,261 B2 | 1/2004 | Shandony | |
| 6,678,827 B1 | 1/2004 | Rothermel et al. | |
| 6,724,726 B1 | 4/2004 | Coudreuse | |
| 6,728,767 B1 | 4/2004 | Day et al. | |
| 6,742,114 B1 | 5/2004 | Carter et al. | |
| 6,745,197 B2 | 6/2004 | McDonald | |
| 6,748,453 B2 | 6/2004 | Law et al. | |
| 6,751,562 B1 | 6/2004 | Blackett et al. | |
| 6,763,040 B1 | 7/2004 | Hite et al. | |
| 6,779,004 B1 * | 8/2004 | Zintel | 709/227 |
| 6,782,414 B1 | 8/2004 | Xue et al. | |
| 6,782,542 B1 | 8/2004 | Mein et al. | |
| 6,789,118 B1 | 9/2004 | Rao | |
| 6,801,528 B2 * | 10/2004 | Nassar | 370/389 |
| 6,850,893 B2 | 2/2005 | Lipkin et al. | |
| 6,850,979 B1 | 2/2005 | Saulpaugh et al. | |
| 6,851,054 B2 | 2/2005 | Wheeler et al. | |
| 6,873,975 B1 | 3/2005 | Hatakeyama et al. | |
| 6,891,953 B1 | 5/2005 | DeMello et al. | |
| 6,920,558 B2 | 7/2005 | Sames et al. | |
| 6,928,442 B2 | 8/2005 | Farber et al. | |
| 6,970,935 B1 | 11/2005 | Maes | |
| 6,976,074 B2 | 12/2005 | Cabrera et al. | |
| 6,990,585 B2 | 1/2006 | Maruyama et al. | |
| 7,035,854 B2 | 4/2006 | Hsiao et al. | |
| 7,051,339 B2 | 5/2006 | Deverill et al. | |
| 7,055,143 B2 | 5/2006 | Ringseth et al. | |
| 7,065,706 B1 | 6/2006 | Sankar | |
| 7,127,511 B2 | 10/2006 | Tonouchi | |
| 7,149,802 B2 | 12/2006 | Cabrera et al. | |
| 7,181,731 B2 | 2/2007 | Pace et al. | |
| 7,194,553 B2 | 3/2007 | Lucco et al. | |
| 7,293,283 B2 | 11/2007 | Kaler et al. | |
| 7,409,367 B2 | 8/2008 | McGill et al. | |
| 7,418,457 B2 | 8/2008 | Kaler et al. | |
| 7,451,157 B2 | 11/2008 | Kaler et al. | |
| 2001/0009018 A1 | 7/2001 | Iizuka | |
| 2002/0002581 A1 | 1/2002 | Siddiqui | |
| 2002/0078233 A1 | 6/2002 | Biliris et al. | |
| 2002/0126701 A1 | 9/2002 | Requena | |
| 2002/0138582 A1 | 9/2002 | Chandra et al. | |
| 2002/0143984 A1 | 10/2002 | Hudson Michel | |
| 2002/0152214 A1 | 10/2002 | Muntz | |
| 2002/0157004 A1 | 10/2002 | Smith et al. | |
| 2002/0169781 A1 | 11/2002 | Poole et al. | |
| 2002/0174178 A1 | 11/2002 | Stawikowski | |
| 2002/0178103 A1 | 11/2002 | Dan et al. | |
| 2002/0184319 A1 | 12/2002 | Willner et al. | |
| 2002/0188638 A1 | 12/2002 | Hamscher | |
| 2003/0041178 A1 | 2/2003 | Brouk et al. | |
| 2003/0050966 A1 | 3/2003 | Dutta et al. | |
| 2003/0065942 A1 | 4/2003 | Lineman et al. | |
| 2003/0074357 A1 | 4/2003 | Nielsen et al. | |
| 2003/0074367 A1 | 4/2003 | Kaler et al. | |
| 2003/0074482 A1 | 4/2003 | Christensen et al. | |
| 2003/0074579 A1 | 4/2003 | Della-Libera et al. | |
| 2003/0093678 A1 | 5/2003 | Bowe et al. | |
| 2003/0120593 A1 | 6/2003 | Bansal et al. | |
| 2003/0159059 A1 | 8/2003 | Rodriquez et al. | |
| 2004/0034715 A1 * | 2/2004 | Dawson et al. | 709/238 |
| 2004/0088585 A1 | 5/2004 | Kaler et al. | |
| 2005/0138353 A1 | 6/2005 | Spies et al. | |
| 2005/0278390 A1 | 12/2005 | Kaler et al. | |
| 2006/0041743 A1 | 2/2006 | Della-Libera et al. | |
| 2006/0041929 A1 | 2/2006 | Della-Libera et al. | |
| 2006/0212599 A1 | 9/2006 | Lucco et al. | |
| 2006/0253699 A1 | 11/2006 | Della-Libera et al. | |
| 2006/0253700 A1 | 11/2006 | Della-Libera et al. | |
| 2008/0141028 A1 | 6/2008 | Wei et al. | |
| 2008/0263166 A1 | 10/2008 | Beigi et al. | |

FOREIGN PATENT DOCUMENTS

| | | |
|---|---|---|
| EP | 1003308 | 5/2000 |
| EP | 1024627 | 8/2000 |
| EP | 1118925 | 7/2007 |
| JP | 7141296 | 6/1995 |
| JP | 11328033 | 11/1999 |

| | | |
|---|---|---|
| JP | 2000083049 | 3/2000 |
| JP | 2000253066 | 9/2000 |
| JP | 2000516406 | 12/2000 |
| JP | 2000516407 | 12/2000 |
| JP | 2002507295 | 5/2002 |
| WO | 9534972 | 12/1995 |
| WO | 9854644 | 12/1998 |
| WO | 9937066 | 7/1999 |
| WO | 0004458 | 1/2000 |
| WO | 0008909 | 2/2000 |
| WO | 0042748 | 7/2000 |
| WO | 0146783 | 6/2001 |
| WO | 0152496 | 7/2001 |
| WO | 0158108 | 8/2001 |
| WO | 2007073609 | 7/2007 |

OTHER PUBLICATIONS

Office Action dated Jun. 28, 2005 cited in U.S. Appl. No. 10/270,441.
Office Action dated Feb. 6, 2006 cited in U.S. Appl. No. 10/270,441.
Office Action dated Jun. 12, 2006 cited in U.S. Appl. No. 10/270,441.
Office Action dated Nov. 21, 2006 cited in U.S. Appl. No. 10/270,441.
Office Action dated Jun. 13, 2007 cited in U.S. Appl. No. 10/270,441.
Office Action dated Mar. 13, 2008 cited in U.S. Appl. No. 10/270,441.
Office Action dated Mar. 17, 2009 cited in U.S. Appl. No. 10/270,441.
Notice of Allowance dated Dec. 3, 2009 cited in U.S. Appl. No. 10/270,442.
SOAP Security Extensions: Digital Signature, W3C NOTE Feb. 6, 2001, http://www.w3.org/TR/2001/NOTE-SOAP-dsig-20010206/.
IP Encapsulating Security Payload (ESP), Ipsec Working Group, Internet Draft, Draft-ietf-ipsec-esp-v3-03.txt, Expires Jan. 2003, S. Kent, BBN Technologies, Jul. 2002.
Http://www.w3.org/TR/2001/PR-xmldsig-core-20010820/.
An Introduction to XML Digital Signatures, Simon et al., http://www.xml.com/pub/a/2001/08/08/xmldsig.html.
Kees Leune, Mike Papazoglou, Willem-Jan Van Den Heuvel, "Specification and Querying of Security Constraintss in the EFSOC Framework", Nov. 2004, ICSOC '04: Proceedings of the 2nd International Conference on Service Oriented Computing, pp. 125-133.
Mourad, A. et al., "Scalable Web Server Architectures"; Proceeding IEEE International Symposium on Computer and Communications; Jul. 1, 1999; pp. 12-16; WP000199852.
Wallstrom, Bengt, "Queuing System with *Time*-*Outs* and Random Departures", Ericsson Techincs, v 33 n 2 1977, pp. 151-174.
11. Using Dublin Core, issued Jul. 16, 2000 by Diane Hillmann, pp. 1-10.
Structured Graph Format: XML Metadata for describing website structure, Liechi et al. pp. 11-21, Issued 1998.
Mourad, A. et al., "Scalable Web Server Architectures"; Proceeding IEEE International Symposium on Computer and Communications; Jul. 1, 1999; pp. 12-16; WP000199852.
Nikkei Network, No. 17, Sep. 2001, pp. 94-97.
"Windows NT TCP/IP Networking 9. DNS (Domain Name System)", Let's Start with TCP/IP, Dec. 31, 2000, pp. 156-159.
"Preliminary Knowledge for Managing a Website, Basic Knowledge of Domain Name," Basics of Creating a Website Which Can Be Understood With the Help of Illustration, Aug. 31, 2000, pp. 179-185.
Nikkei Network, No. 4, Aug. 2000, pp. 104-112.
Nikkei Byte, No. 211, Dec. 2000, pp. 176-181.
Nikkei Communications, No. 355, Feb. 5, 2001, pp. 106-113.
Nikkei Communications, No. 340, Apr. 16, 2001, pp. 216-217.
Conference paper, Proceedings—Twenty Third Annual International Computer Software and Applications Conference, Publication Date 1999, USA, date Oct. 27-29, 1999.
Cantor, "The ICAAP Project 3 PSF Distributed Computing Environment", Journal—Library Hi Tech, vol. 15, No. 1-2, p. 79-83, Publication Date 1997, USA.
Simms, "Windows on the Internet", Journal—Wall Street & Technology, Suppl. Issue p. 16, 18-19, Publication Dated Fall 1997, USA—Abstract.
Doward, Pike, Presotto, Ritchie, Trickey, Winterbottom; "The Inferno /sup TM/ Operating System", Journal—Bell Labs Technical Journal, vol. 2, No. 1, p. 15-18 Publication Date, Winter, 1997, USA.
Benner, Russell, "Practical High-Impedance Fault Detection on Distribution Feeders", Journal—IEEE Transactions on Industry Applications, vo. 33, No. 3, p. 635-640, publication date May-Jun. 1997, USA.
Conference—Jones, "Computer Use Policies, the Challenge of Updating Lab Software Security", User Services Conference XXI Part Vol. 1, pp. 222-224, vol. 1, Publication Date 1993, USA.
Udell, "Lan Manager 2.0: A Force to be Reckoned With" Journal—BYTE, vol. 15, No. 13, pp. 221-222, 224, 226, Publication Date Dec. 1990, USA.
Conference—Olson, Levine, Jones, Bodoff, Bertrand, "Proceedings of the Summer 1988 USENIX Conference", pp. 287-294, Publication date 1988, USA, Conference date Jun. 21-24, 1988—San Francisco.
"XML Schema Part 0: Primer", W3C Proposed Recommendation, Mar. 30, 2001, 64 Pages (Dec. 11, 2004).
CCIE Fundamentals: Network Design and Case Studies, Second Edition, By Cisco Systems, Inc. Publisher: Cisco Press, Publication Date: Oct. 19, 1999, Print ISBN—10: 1-57870-167-8.
European Search Report—Application No. 02023017—Oct. 6, 2005.
G. Bull et al., "Access Control Lists", printed from http://curry.edschool.virginia.edu/go/spinning/ACL_Permissions.html on Sep. 18, 2002, 5 pages.
Security in JDK 1.1, Access Control Abstractions, May 2, 1997, printed from http://java.sun.com/products/jdk/1.1/docs/guide/security/Acl.html, on Sep. 18, 2002, 4 pages.
T. Saito, et al. "Privacy Enhanced Access Control by SPKI", IEEE, 2000, pp. 301-306.
G. Fernandez et al., "Extending the UNIX Protection Model with Access Control Lists", Proceedings of the Summer 1998 USENIX Conference, Jun. 20-24, 1988, pp. 119-132.
A. Chander et al, "A State-Transition Model of Trust Management and Access Control", Proceedings 14th IEEE Computer Security Foundations Workshop, Jun. 11-13, 2001, pp. 27-43.
D. Wichers et al., "PACL's: An Access Control List Approach to Anti-Viral Security", Information Systems Security: Standards—The Key to the Future: 13th National Computer Security Conference, Oct. 1-4, 1990, pp. 340-349.
M. Benantar et al., "Use of DSOM Before/After Metaclass for Enabling Object Access Control", IRP/IEEE International Conference on Distributed Platforms: Client/Server and Beyond, 1996, pp. 73-85.

M. Koch et al., "Conflict Detection and Resolution in Access Control Policy Specifications", FOSSACS 2002, pp. 223-237.

M. Calbucci, "Windows 2000 Security Descriptors", Dr. Dobb's Journal, vol. 25, No. 11, Nov. 2000, pp. 57-58,60,63,66.

J. Hwang, et al., "Access control with role attribute certificates", Computer Standards and Interfaces, vol. 22, No. 1, Mar. 2000, pp. 43-53.

J. Qian, et al., "ACLA: A Framework for Access Control List (ACL) Analysis and Optimization", IFIP TC6/TC11 Joint Working Conference on Communications and Multimedia Security 5th, 2001, pp. 197-211.

"IP Routing Policies and Filters", printed from http://support.baynetworks.com/library/tpubs/htrnl/switches/bstream/115401A /L__17.htm on Sep. 26, 2002.

K. Swaminathan, "Negotiated Access Control", Proceedings of the 1985 Symposium on Security and Privacy: Apr. 22-24, 1985, pp. 190-196.

W. LeFebvre, "Permissions and Access Control Lists", Performance Computing, vol. 16, No. 11, Oct. 1998, pp. 59-61.

B. Dunkel et al., "Customized Metadata for Internet Information", 1997 First International Conference on Knowledge-Based Intelligent Electronic Systems: Proceedings, vol. 2, May 21-23, 1997, pp. 508-516.

U. Srinvasan et al., "Managing Heterogeneous Information Systems through Discovery and Retrieval of Generic Concepts", Journal of the American Society for Information Science, vol. 51, No. 8, Jun. 2000, pp. 707-723.

J. Martinez et al., "MPEG-7 the Generic Multimedia Content Description Standard, Part 1", vol. 9, No. 2, Apr.-Jun. 2002, pp. 78-87.

C. Süβ et al., "Meta-modeling for Web-Based Teachware Management", Advance in Conceptual Modeling: ER '99 Workshops on Evolution and Change in Data Management, Reverse Engineering in Information Systems, and the World Wide Web and Conceptual Modeling, 1999, 360-373.

K. Lang et al., "XML, Metadata and efficient Knowledge Discovery", Knowledge-Based Systems, vol. 13, No. 5, Oct. 2000, pp. 321-331.

T. Baker, "A Multilingual Registry for Dublin Core Elements and Qualifiers", ZfBB 47, 2000, pp. 14-19.

J. Moy, OSPF Version 2, Networking Working Group, RFC 2328, Ascend Communications, Inc., Apr. 1998, pp. 1-204.

J. Moy, OSPF Version 2, Networking Working Group, RFC 1247, Proteon, Inc., Jul. 1991, pp. 1-177.

Office Action dated Oct. 4, 2005 cited in U.S. Appl. No. 10/068,444.

Office Action dated Mar. 31, 2006 cited in U.S. Appl. No. 10/068,444.

Office Action dated Oct. 13, 2006 cited in U.S. Appl. No. 10/068,444.

Office Action dated Jan. 26, 2009 cited in U.S. Appl. No. 11/422,106.

Office Action dated Nov. 17, 2003 cited in U.S. Appl. No. 10/219,898.

Office Action dated Apr. 21, 2004 cited in U.S. Appl. No. 10/219,898.

Office Action dated Oct. 6, 2004 cited in U.S. Appl. No. 10/219,898.

Office Action dated Oct. 26, 2006 cited in U.S. Appl. No. 10/219,898.

Office Action dated MAr. 26, 2007 cited in U.S. Appl. No. 10/219,898.

Notice of Allowance dated Aug. 15, 2007 cited in U.S. Appl. No. 10/219,898.

Office Action dated Mar. 22, 2007 cited in U.S. Appl. No. 10/693,290.

Office Action dated Sep. 20, 2007 cited in U.S. Appl. No. 10/693,290.

Office Action dated MAr. 28, 2008 cited in U.S. Appl. No. 10/693,290.

Notice of Allowance dated Oct. 15, 2008 cited in U.S. Appl. No. 10/693,290.

Office Action dated Jan. 7, 2005 cited in U.S. Appl. No. 09/983,555.

Office Action dated Jul. 7, 2005 cited in U.S. Appl. No. 09/983,555.

Office Action dated Mar. 23, 2006 cited in U.S. Appl. No. 09/983,555.

Office Action dated Sep. 11, 2006 cited in U.S. Appl. No. 09/983,555.

Office Action dated Sep. 21, 2004 cited in U.S. Appl. No. 09/993,656.

Office Action dated Dec. 23, 2004 cited in U.S. Appl. No. 09/993,656.

Office Action dated Nov. 29, 2005 cited in U.S. Appl. No. 09/993,656.

Notice of Allowance dated May 25, 2007 cited in U.S. Appl. No. 09/993,656.

Office Action dated Dec. 30, 2004 cited in U.S. Appl. No. 09/983,539.

Office Action dated Jun. 17, 2005 cited in U.S. Appl. No. 09/983,539.

Office Action dated Jan. 18, 2006 cited in U.S. Appl. No. 09/983,539.

Notice of Allowance dated May 8, 2006 cited in U.S. Appl. No. 09/983,539.

Office Action dated May 28, 2008 cited in U.S. Appl. No. 11/254,545.

Office Action dated May 28, 2008 cited in U.S. Appl. No. 11/254,539.

Office Action dated Mar. 7, 2006 cited in U.S. Appl. No. 11/254,519.

Office Action dated Aug. 11, 2006 cited in U.S. Appl. No. 11/254,519.

Office Action dated Nov. 5, 2004 cited in U.S. Appl. No. 10/007,060.

Office Action dated May 11, 2005 cited in U.S. Appl. No. 10/007,060.

Notice of Allowance dated Jun. 27, 2005 cited in U.S. Appl. No. 10/007,060.

Office Action dated Jul. 20, 2005 cited in U.S. Appl. No. 10/999,837.

Office Action dated Dec. 21, 2005 cited in U.S. Appl. No. 10/999,837.

Office Action dated May 25, 2006 cited in U.S. Appl. No. 10/999,837.

Notice of Allowance dated Sep, 18, 2006 cited in U.S. Appl. No. 10/999,837.

Office Action dated Nov. 26, 2008 cited in U.S. Appl. No. 11/254,545.

Office Action dated Nov. 28, 2008 cited in U.S. Appl. No. 11/254,539.

Office Action dated Mar. 23, 2006 cited in U.S. Appl. No. 11/254,264.

Office Action dated Aug. 11, 2006 cited in U.S. Appl. No. 11/254,264.
Office Action dated Mar. 7, 2007 cited in U.S. Appl. No. 11/254,264.
Office Action dated Aug. 7, 2007 cited in U.S. Appl. No. 11/254,264.
Office Action dated May 29, 2008 cited in U.S. Appl. No. 11/254,264.
Office Action dated Nov. 17, 2008 cited in U.S. Appl. No. 11/254,264.
Office Action dated Jul. 8, 2009 cited in U.S. Appl. No. 11/254,545.
Office Action dated Jul. 9, 2009 cited in U.S. Appl. No. 11/254,264.
Office Action dated Jul. 9, 2009 cited in U.S. Appl. No. 11/254,539.
Notice of Allowance dated Aug. 10, 2009 cited in U.S. Appl. No. 11/422,106.
Office Action dated Mar. 21, 2007 cited in U.S. Appl. No. 11/207,034.
Office Action dated Oct. 4, 2007 cited in U.S. Appl. No. 11/207,034.
Office Action dated May 28, 2008 cited in U.S. Appl. No. 11/207,034.
Office Action dated Dec. 5, 2008 cited in U.S. Appl. No. 11/207,034.
Office Action dated May 11, 2009 cited in U.S. Appl. No. 11/207,034.
Notice of Allowance dated Oct. 27, 2009 cited in U.S. Appl. No. 11/422,106.
Office Action dated Feb. 23, 2006 cited in U.S. Appl. No. 10/270,442.
Office Action dated Aug. 3, 2006 cited in U.S. Appl. No. 10/270,442.
Office Action dated Jan. 24, 2007 cited in U.S. Appl. No. 10/270,442.
Office Action dated Aug. 8, 2007 cited in U.S. Appl. No. 10/270,442.
Office Action dated Jan. 25, 2008 cited in U.S. Appl. No. 10/270,442.
Office Action dated Sep. 15, 2008 cited in U.S. Appl. No. 10/270,442.
Office Action dated Feb. 26, 2009 cited in U.S. Appl. No. 10/270,442.
Notice of Allowance dated Sep. 1, 2009 cited in U.S. Appl. No. 10/270,442.
European Search Report dated Jun. 28, 2006 (02023016.5), 6 pages.
Partial European Search Report dated Apr. 19, 2006 (02023016.5), 3 pages.
Peter H. Rotzal, "X.400 Message Handling System: The Remote User Agent", Proceedings of the Military Communications Conference (MILCOM), Jun. 11, 1995, vol. 1, pp. 433-437.
"TIBCO Rendezvous—a TIBCO Active Enterprise Product", <http://www.tibco.com/products/rv/index/html>, printed Dec. 10, 2001, 2 pages.
"TIBCO Rendezvous TX - a TIBCO Active Enterprise Product", <http://www.tibco.com/products/rv/rvtx.html>, printed Dec. 10, 2001, 2 pages.
"TIBCO Enterprise for JMS", <http://www.tibco.com/products/enterprise_for_jms.html>, printed Dec. 10, 2001, 1 page.
Henrik F. Nielsen et al., "SOAP Routing Protocol", <http://www.gotdotnet.com/team/xml_wsspecs/soap-rp/default.html>, May 23, 2001, 36 pages.
G. Robert Malan et al., "An Extensible Probe Architecture for Network Protocol Performance Measurement", Department of electrical Engineering and Computer Science, University of Michigan, SIGCOMM 1998, Vancouver, pp. 215-227.
Kunihiko Toumura et al., "Implementing Multiple Name Spaces Using an Active Network Technology", Jun. 2000, pp. 1665-1676.
David Potter et al., "Connecting minis to local nets with discrete modules", Data Communications, Jun. 1983, pp. 161-164.
Steven M. Dean et al., "CONE: A Software Environment for Network Protocols", Hewlett-Packard Journal, Feb. 1990, pp. 18-28.
Fumiko Kouda et al., "Representation of Descriptive Name and the Resolution Method with a Semantic Network Structure", Journal of Information Processing, vol. 15, No. 2, 1992, pp. 280-292.
Henrik F. Nielsen et al., "Direct Internet Message Encapsulation", May 23, 2001, 13 pages.
B. Ramsey, "An RTOS with its Nest is pure dynamite", Electronic Engineering Times, Sep. 11, 1995, No. 865, p. 76, 3 pages.
Richard Bowers, "Apple's Free Internet Domain Name Server Software", Post-Newsweek Business Information, Inc., May 2, 1996, 1 page.
Office Action dated Dec. 10, 2009 cited in U.S. Appl. No. 11/254,545.
Office Action dated Dec. 10, 2009 cited in U.S. Appl. No. 11/254,539.
Notice of Allowance dated Jan. 26, 2010 cited in U.S. Appl. No. 11/254,264.
Notice of Allowance dated Jan. 27, 2010 cited in U.S. Appl. No. 11/254,539.
Notice of Allowance dated Jan. 29, 2010 cited in U.S. Appl. No. 11/254,545.
Notice of Allowance dated Feb. 4, 2010 cited in U.S. Appl. No. 11/207,034.
Notice of Allowance dated Mar. 12, 2010 cited in U.S. Appl. No. 11/207,034.
Mark Bartel et al., "XML—Signature Syntax and Processing", Aug. 20, 2001, 60 pages, http://www.w3.org/TR/2001/PR-xmldsiq-core-20010820/.
Xinghuo Yu; Zhihong Man; "Finite *time* *output* Tracking Problem with Terminal Sliding Mode Control," Computational Engineering in Systems Applications, Part vol. 1, pp. 28-31, vol. 1, Publisher: Gerf EC Lille—Cite Scientifique, Lille France.
Edge, S.W. "An Adaptive *timeout* Algorithm for Retransmission Across a Packet Switching Network", Computer Communication Review, vol. 14, No. 2, pp. 248-255, Published in USA, Jun. 1984.
U.S. Appl. No. 10/270,441, filed Jun. 23, 2010, Office Action.

* cited by examiner

VIRTUAL MAPPING TABLE

| VIRTUAL ADDRESS | PHYSICAL ADDRESS |
|---|---|
| HTTP://WWW.FOO.COM/ | HTTP://1.2.3.5/FOO.HTM |
| JOE | HTTP://12.34.56.78/USERS/JOE |
| GAMESERVER | HTTP://WWW.MSN.COM/GAMES |
| NEWS | HTTP://WWW.MSNBC.COM |
| EMAIL | HTTP://MAIL.MSN.COM |
| FTPSERVER | FTP://FTP.MSN.COM |

FIG. 12

VIRTUAL MAPPING TABLE

| VIRTUAL ADDRESS | PHYSICAL ADDRESS |
|---|---|
| HTTP://WWW.FOO.COM/ | HTTP://6.7.8.11/FOO.HTM |
| JOE | HTTP://12.34.56.78/USERS/JOE |
| GAMESERVER | HTTP://WWW.MSN.COM/GAMES |
| NEWS | HTTP://WWW.MSNBC.COM |
| EMAIL | HTTP://MAIL.MSN.COM |
| FTPSERVER | FTP://FTP.MSN.COM |

FIG. 13

VIRTUAL NETWORK WITH ADAPTIVE DISPATCHER

CROSS-REFERENCE TO RELATED APPLICATIONS

This application is a continuation of U.S. Pat. No. 7,257,817, issued Aug. 14, 2007, having the same title as above, and which in turn relates to and claims priority from U.S. Provisional Application Ser. No. 60/329,796, filed Oct. 16, 2001, and U.S. Provisional Application Ser. No. 60/346,370, filed Oct. 19, 2001, each of the above being herein incorporated by reference.

FIELD OF THE INVENTION

The invention relates generally to computer networks. More specifically, the invention relates to a virtual network that adaptively routes messages based on message contents.

BACKGROUND OF THE INVENTION

Various levels of abstraction exist within computer architecture, from the physical representation of ones and zeros to high-level application programs. When computers were initially developed, a low-level programming language commonly referred to as machine language was generally used to control their operation. However, in order to create the same program for two different computer platforms with different machine languages, programmers had to write the program twice-once in each platform's machine language.

Computer programmers learned that machine language could be abstracted by creating higher-level programming languages, such as C and Pascal, and then providing a compiler for each platform on which the program was to be used. When a program was written in one of these higher-level programming languages, the program could be compiled to run on each specific machine, without having to rewrite the source program for each machine. Abstractions in this regard continued, resulting in the more recent development of virtual machines.

The notion of a virtual machine is well known in the art of computer science. A virtual machine is an intermediate representation that is not tied to the specific details of a particular computer hardware architecture. Typically a virtual machine will guarantee certain semantics that remain identical regardless of the hardware used to implement it. Therefore a program which has been written for such a machine can be executed on different hardware systems without modification. Thus, one advantage of a virtual machine is that its operational semantics remain constant from one computer program to the next regardless of the origin or operating requirements of any one computer program.

Computer networks are dependent on the underlying physical hardware and network protocols on which the network is constructed. These protocols in turn are dependent on the underlying network architecture on which they are implemented. As a result, network applications must be rewritten for each network on which they are to be used. In addition, in order for two machines to communicate over a network, each machine must understand how to communicate over the specific network, i.e., each machine must have the appropriate network drivers to communicate.

One level of abstraction that has been implemented in computer networks is the use of a TCP/IP protocol stack, as implemented according to the OSI seven-layer network model. TCP/IP abstracts some notions of network protocols, allowing two machines that each understand the TCP/IP protocols to effectively communicate with each other. However, even using TCP/IP, each machine must, at some level, be able to understand network routing and topology, bindings, and DNS resolution. That is, each computer on a network must still have substantial network support utilities installed in order to effectively communicate over the network, because the OSI model only virtualizes the physical wire between the machines, and not the network through which the machines communicate.

For example, TCP/IP requires applications to understand the concepts of ports and IP addresses. Ports and IP addresses, in turn, require applications to understand DNS name resolution, network topology, transport bandwidths and end-to-end routing. Thus, while simplifying the model for exchanging ordered sequences of bytes in a reliable manner, the application still must deal directly with many network level concepts and details. The OSI model does not address higher-level constructs, such as naming, routing, and quality of service, as needed by network applications.

Another shortcoming of conventional networks is the inability to adapt and rehabilitate after a message error or network failure. Present networks cannot easily adapt automatically when machines are added, moved, or removed. That is, a user typically must edit routing tables to inform the network of the change.

In addition, network failures are not easily fixed, other than by maintaining redundant machines that perform the same function. That is, if a first machine fails, then the second (backup) machine takes over the first machine's functions. However, if the second machine subsequently fails, and there is no third machine that performs the same functions, the network will suffer as a result. Known networks are not self-healing. Thus, an advanced network that overcomes these problems is needed.

Another shortcoming of conventional networks is their inability to dynamically route network messages based on message contents. Known routers by Cisco Systems, Inc. are capable of routing messages based on predefined criteria, but are not dynamically programmable to support user-extensible routing behavior based on message content. This inability makes them inappropriate for systems in which applications can control transformations and processing of messages, in addition to the traditional routing and QoS requirements.

It would be an advancement in the art to provide a method and system that solves some or all of the above-identified problems.

BRIEF SUMMARY OF THE INVENTION

Aspects of the invention may be used to virtualize a network to allow programmers to write platform independent network computer applications. A virtual network may be created by adding an abstraction layer (software or hardware) between the applications providing network services and the underlying network of systems that executes that code, for example, between layers 6 and 7 in the OSI network model. One or more virtualized components may be inserted, including synchronization, eventing, messaging, naming, groups, addressing, and routing components.

By abstracting the networking system, the network may more efficiently and securely provide services inherently to the applications and services built on top of it. For example, services such as reliability, security, platform independence, scale-out, edge networking, and location independence may easily be provided. Also, the system may adapt to physical topology changes and automatically "heal" from failures. The virtual network is responsible for mapping code onto the physical topology of the network and transparently adapting that mapping. Additionally, developers may benefit from isolation of their services.

By combining the virtual network with a virtual machine, a distributed, partitionable virtual network can be created where an application can be written once and run on any machine. That is, a network application written for use in a virtual network, and on a computer running a virtual machine, does not need to be rewritten because it is able to run on any machine that operates the same virtual machine and is connected to the virtual network.

The virtual network also provides adaptive reconfiguration capabilities. Suppose that machine A sends a message to machine B over a network, and B replies back to machine A. However, before machine A can send a second message to machine B, machine B moves (e.g., to another IP address). According to one embodiment, a virtual network may resolve itself and adapt to the changed location such that the message is still delivered to B's new location. The address change may take place transparently so that the applications running on the network(s) never know (or need to know) that a change in B's location was made. No restrictions are placed on the set of locations to which each machine may be moved because abstraction is moved from the machine level to the network level. After a device has been moved, once it identifies itself to the network at the new location the virtual network has the ability to update itself so that the routing to the machine can continue to operate uninterrupted. This ability extends what is currently possible within single administrative domains to multiple administrative domains, enabling location mobility to extend across organizations.

A first embodiment of the invention provides an apparatus that includes a message dispatcher that routes and dispatches messages. Each message is routed based on an arbitrary portion of the message's contents. There is also an interface through which network application programs communicate with the message dispatcher to define the arbitrary portion of the message's contents on which the message is routed.

In another embodiment of the invention, there is a data processing apparatus that includes a message dispatcher module, a transport adapter for interfacing the message dispatcher to a transport protocol, an interface through which application programs communicate with the message dispatcher, and stored rules instructing the message dispatcher to route a first network message based on a first attribute of said first network message, and route a second network message based on a second attribute, different from the first attribute, of the second network message. The first and second attributes are selected from a set of headers and data contained in each network message.

Another embodiment provides a method for routing network messages. A message dispatcher routes a first network message based on a first attribute of the first network message. The message dispatcher routes a second network message based on a second attribute, different from the first attribute, of the second network message. The first and second attributes may be any field selected from a set of headers and data of each network message.

In another embodiment, there is a network router that stores computer executable instructions that, when executed by the router, perform a set of steps. The network router stores routing information received from a network application. The routing information comprises a message field, a field condition, and a message instruction. The network router receives and processes a network message by comparing the network message to the stored routing information. When the received message's message field meets the field condition, the network router performs the message instruction.

Another embodiment of the invention provides a virtual computer network. The computer network includes a plurality of computers, each configured with at least one transport adapter that converts messages between a transport layer protocol and a network protocol, and a message dispatcher that routes and dispatches messages based on an arbitrary portion of the message's contents. The message dispatcher in each computer routes messages in the virtual network protocol over the transport layer protocol using the transport adapter(s).

In another embodiment of the invention, there is a virtual network that includes at least one virtualized component inserted between layers 6 and 7 of an OSI protocol stack.

BRIEF DESCRIPTION OF THE DRAWINGS

FIG. 12 illustrates a sample virtual mapping table.

FIG. 13 illustrates the sample virtual mapping table of FIG. 12 after the system has adapted to a machine failure.

DETAILED DESCRIPTION OF THE INVENTION

Figure 1:
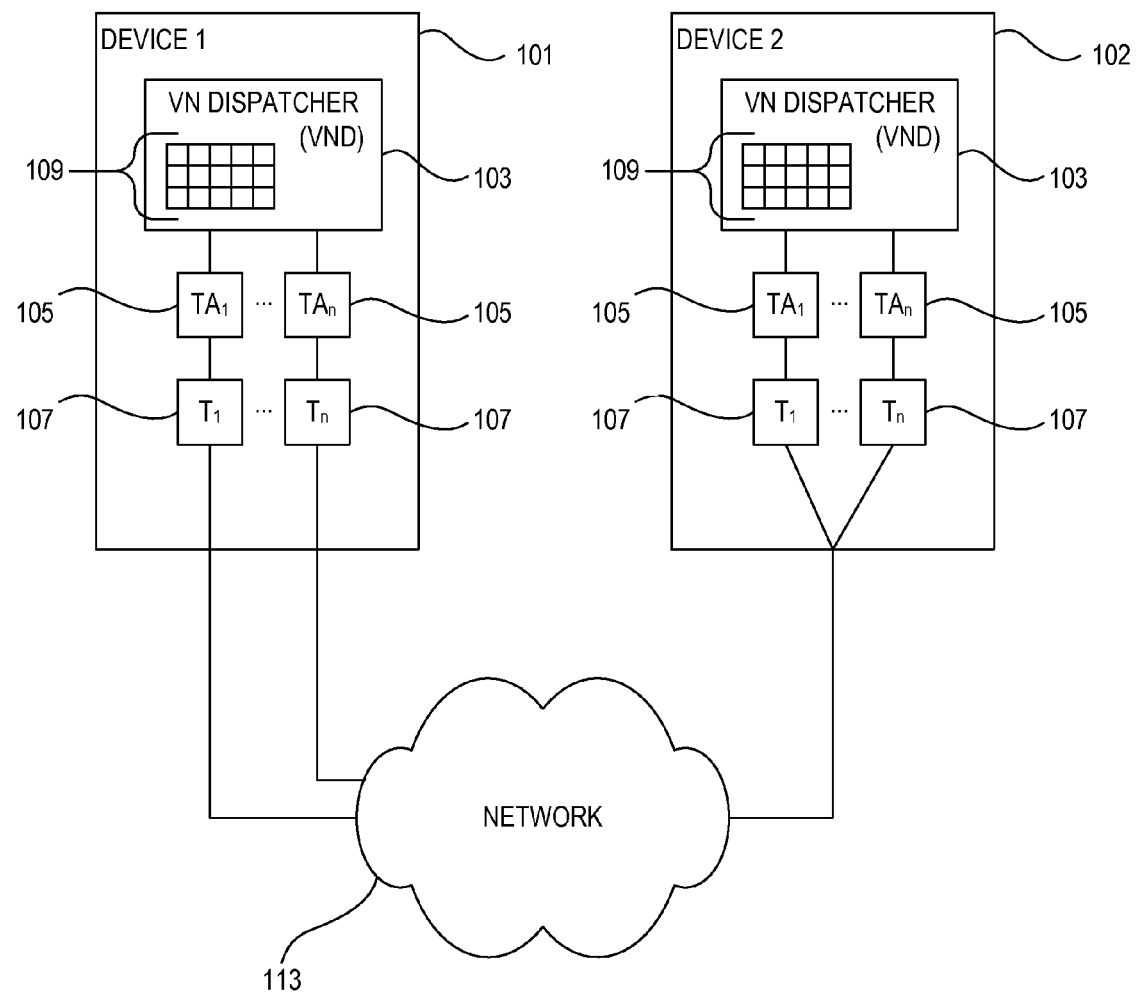
FIG. 1 illustrates a block diagram of two nodes in a virtual network according to an embodiment of the invention.

Message resolution in a virtual network can be accomplished through the use of virtual locations in combination with a universal enabling component, referred to as a virtual network dispatcher (VND), which is included in every resource that participates within the virtual network. A resource may be defined as any message endpoint. With reference to FIG. 1, every device 101-102 on a virtual network 113 is given a virtual address to which its actual address (such as an IP address, MAC address, URL, or other location identifier) may be mapped. The VND 103 may comprise a router module integrated within each device that, using either hardware or software, responds in the same manner to a message regardless of the device on which the router is installed. That is, the router module is device independent. VND 103 includes message handlers 109, further described below.

Message handlers 109 may vary from machine to machine, or they may be consistent across machines. Each message handler may be explicitly configured for a specific type of machine, or may be configured to specifically operate or not operate on any given machine. Some message handlers may be broadly deployed, e.g., message header handlers and encryption handlers, while other message handlers may only be deployed on a single machine.

Each VND is responsible for performing routing and dispatching functions. Routing is the process of forwarding messages to the device for which they are intended. Dispatching is the process of, upon receiving a message, executing the proper handler (e.g., a software module, function, application program, routine, etc.) or other executable software, in response to receiving the message. The handler that the VND executes may be a routing handler that determines how the VND should process and route the message, or the handler may send the message to an application program running on the device.

In one embodiment, the VND may route and dispatch XML-based messages in an open, extensible messaging protocol that allows distributed, decentralized applications to exchange information regardless of the operating system, object model, or language that each particular application uses. Any protocol may be used that supports the transport(s) used by the virtual network. The VND may be used in conjunction with network transport protocols 107, e.g. TCP, IP, UDP, HTTP, SMTP, SOAP-RP, etc. As messages are received at a location via any transport protocol, the message contents are extracted by a transport adapter 105, and input into VND 103. Each transport adapter receives as input a message formatted according to a predefined transport protocol, and converts (or strips) the message headers to comply with the virtual network protocol. As shown in FIG. 1, each VND 103 may be connected to multiple transport adapters $TA_1$-$TA_n$ for use with multiple transport protocols $T_1$-$T_n$. This allows each VND to be used across multiple transports, without tying the virtual network to a single transport protocol.

By using multiple transport protocols and protocol adapters, placing a VND 103 on each device provides a platform through which any application program may transparently communicate with another application program independently of the transport layer protocol by using the virtual network protocol. Known in the art are specific application programs that have been configured to communicate over multiple protocols. However, each application program that does so must be specifically configured. Using the virtual network described herein, applications may communicate over multiple protocols without any special configuration, and without even being aware that communications are being transported over multiple protocols. The VND 103 in each specific device sending each message makes the decision regarding the protocol over which to send the message. For each message, a VND may determine which protocol to use based on one or more predefined protocol policies. Alternatively, the protocol used may be dependant on the application or web service driving the VND for the particular message, based on the needs and/or requests of the application or web service.

When a new transport protocol is developed or needed by the virtual network, a new transport adapter may be created and installed for use with each VND. In this manner, the virtual network may take advantage of new transport protocols, without requiring support for each transport protocol to be built into each application in the virtual network. Instead, support for a new transport protocol is provided to each VND, which contains logic instructing when and how to use the new transport protocol in conjunction with the new transport adapter.

The VND unifies local and remote dispatch on a single machine. Unlike conventional networks where only specified or dedicated machines act as routers, typically every device acts as a router in a virtual network. For instance, a device may receive a message, only to determine that the message should actually be delivered somewhere else in the network. When this occurs, the machine forwards the message to the correct recipient, or to that recipient which the machine believes is the correct based on its present routing tables and rules, instead of (optionally) returning an error message to the message sender.

Figure 10:
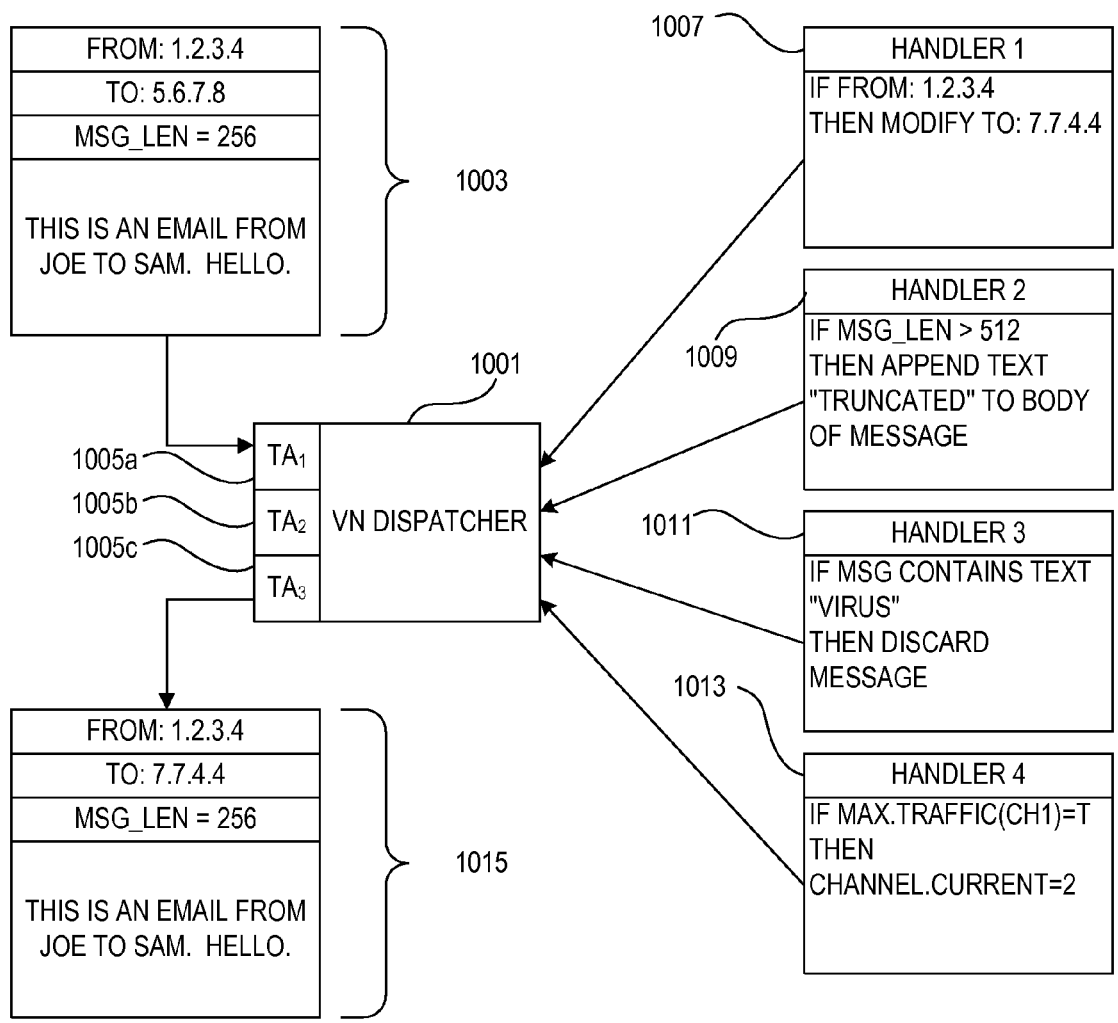
FIG. 10 illustrates data flow through a virtual network dispatcher according to an embodiment of the invention.

FIG. 10 illustrates a message routing example according to an embodiment of the invention. A VND 1001 receives incoming message 1003, with FROM field populated with 1.2.3.4, via transport adapter 1005a. VND 1001 may include multiple transport adapters 1005a, 1005b, and 1005c for use with multiple transport protocols. VND 1001 processes received message 1003 using handlers 1007-1013, each of which instructs VND 1003 to route and/or dispatch messages based on predefined criteria. VND 1001, based on handler 1007, modifies the message's TO field to 7.7.4.4, and outputs routed message 1015 through transport adapter 1005c. Routed message 1015 includes a TO field populated with destination address 7.7.4.4, based on incoming message 1003's FROM field indicating 1.2.3.4.

Because each device acts as a router, a self-healing system may be implemented. When one machine goes down, other machines will automatically compensate and find other paths through which to send messages, making the virtual network fault tolerant. In one embodiment, machines may be placed in redundancy groups. Each machine in the redundancy group can detect that any other machine in the group has failed and left the group. The remaining machines may then update information in one or more message handlers that forward messages to avoid using the machine that is known to be down. Machines can thus compensate for network faults and errors according to instructions encoded in their routing and logic tables, and as further described below. In another embodiment, one or more machine subsystems may be monitoring the network to determine optimal paths and failed paths.

Figure 2:
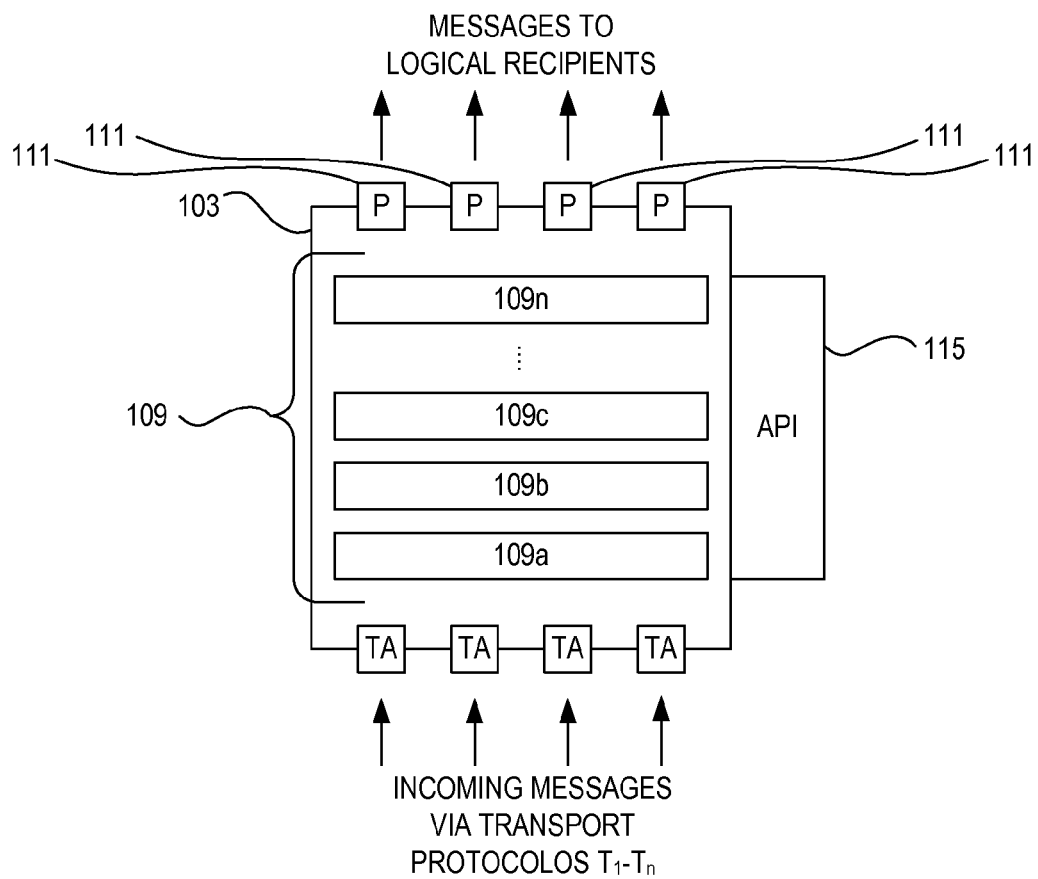
FIG. 2 illustrates a block diagram of a virtual network dispatcher according to an embodiment of the invention.

With reference to FIG. 2, handlers 109 contain logic instructing VND 103 how to process messages, i.e., how to handle incoming messages, how to respond to messages, and how to forward messages. For instance, a first handler $109_a$ may perform virus checking, a second handler $109_b$ may perform security functions, a third handler $109_c$ may perform reliability functions, etc. An unlimited number of handlers 109 may be used, as illustrated in FIG. 2 by $109_n$. New functionality and capabilities may be added to the virtual network by adding a new handler 109 at any given time, without having to modify network applications on each machine. Processed messages are output through logical recipient ports 111. Logical endpoints may be mapped to any physical port on the device from which the message is being sent.

VND handlers 109 may be created such that, in a virtual network, the application network presents to each application a set of logical endpoints, i.e. devices. Applications may communicate with endpoints via messages that use non-uniform semantic rules. For example, a first application may send a message over the network to a second application according to a first message format (e.g., headers and data). One or more handlers can modify the message syntax such that the message is modified before it is received by the second application, and appears in a different message syntax. The endpoints may be mapped onto a physical network that may have varying implementations at each endpoint (i.e., different vendors may provide software and hardware to operate the virtual network once the specifications are publicly available), and may communicate using non-uniform transport protocols between endpoints.

Using the above-described network platform, a virtual network may be configured to be self-organizing. That is, the virtual network may be configured to recover from, adapt to, or reorganize itself in response to a specified event on the network. An event could be any predefined condition that triggers the network self-adaptation, including the nonoccurrence of a condition. For instance, the network may be configured to reorganize when it detects that a node of the network has failed. When this event occurs, one or more handlers may instruct the VND to route packets to a new location. In another example, when load on a network path is high, VNDs may route messages over lesser-trafficked network paths. Alternatively, a user may reorganize the virtual network via a graphical user interface, or other configuration interface.

An application programming interface (API) 115 can be provided, through which application programs may interface with the VND 103. Application programs can be written for the computer's execution engine (e.g., an operating system or a virtual machine) that interfaces using API 115 to configure the VND to respond to each message based on the message contents and/or based on the transport protocol on which it was received. The VND mediates the interaction of the protocol and the underlying execution engine.

Figure 3:
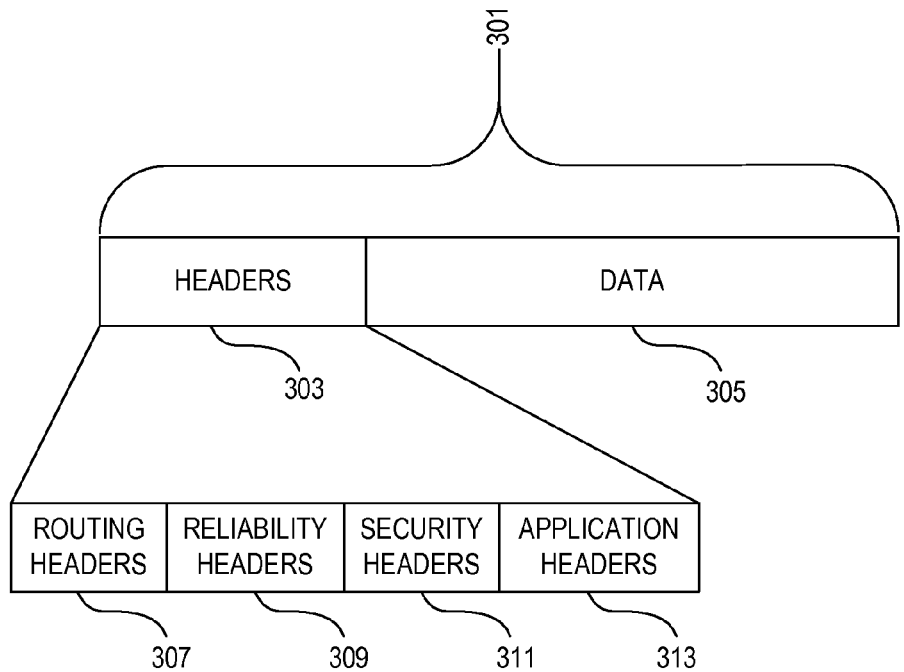
FIG. 3 illustrates a composable message protocol according to an embodiment of the invention.

FIG. 3 illustrates a composable message format used in an embodiment of the invention. Each message 301 includes a header portion 303 and a data portion 305. Headers include information about the information contained in the data portion. That is, headers are a type of metadata pertaining to the data portion 305 of the message 301. Neither the header portion nor the data portion is required to be a fixed length. The headers may include routing headers 307, reliability headers 309, security headers 311, and application headers 313. Routing headers 307 may include, e.g., a sender's address, a recipient's address, and any other information directed towards routing processes. Address fields may be populated with the virtual address of the entity or device to which the address refers. A virtual address is a logical address to which a physical or other logical address may be mapped. Reliability headers 309 may include any headers that ensure that packets arrive at their intended destination. Security headers 311 may include any headers that ensure that the message contents are not compromised to non-intended recipients. Integrity headers may be included with security or reliability headers, based on a particular application's needs. Application headers 313 may include any headers not previously accounted for, as defined by a network application.

In one embodiment, the message protocol is a composable protocol in that application programs can add new functional aspects as needed without interrupting the processing of pre-existing message functionality. In one embodiment, headers are used to provide the new functional aspects. New functional attributes may be stored in one or more message headers. That is, new headers may be added to the existing message without disturbing the processing of the previous message, unlike conventional message protocol suites whereby one message protocol encapsulates another message protocol in order to include a new header (or functional attribute). Thus, the message protocol is extensible in that additional header fields may be added or removed by an application as needed to provide new functionality. This allows network applications to define new header fields and incorporate them into the message format without requiring that every network application be reprogrammed to understand each new message header. Each application program uses only those headers that that specific application program is configured to understand. It may ignore those headers that it does not understand or cannot properly interpret.

The composable protocol may be a modified XML-based protocol, or it may be a modified TCP protocol whereby the additional headers are inserted into the data portion of each TCP message. When an application adds a new header to a message, the application may send a message to one or more VNDs that instructs each VND to create one or more handlers to route and/or dispatch based on the new header.

Each VND 103 may make routing decisions based on any header and/or data field within each message, or any combination of header and/or data fields within each message. Additional or fewer types of headers may be used. Each handler in each VND 103 provides instructions for routing based on message content.

For example, an application program may define and include an "action" header in each message to indicate the action that a user requests of a recipient. If a network user specifies the action subscribe and sets message data 305 to "baseball scores," the message may indicate to a first server that the sending user wants to subscribe to a baseball scores email list. Further, the action field may be populated by a virtual function name, mapping to a specific function at each machine on which it is received. If a network user specifies the action subscribe and sets message data 305 to "MSDN," the message may indicate to a second server that the sending user wants to subscribe to a physical magazine entitled *MSDN Magazine*. Thus, two applications may both use the action subscribe, each in a different manner, as defined by their respective subscribe functions.

Figure 11:
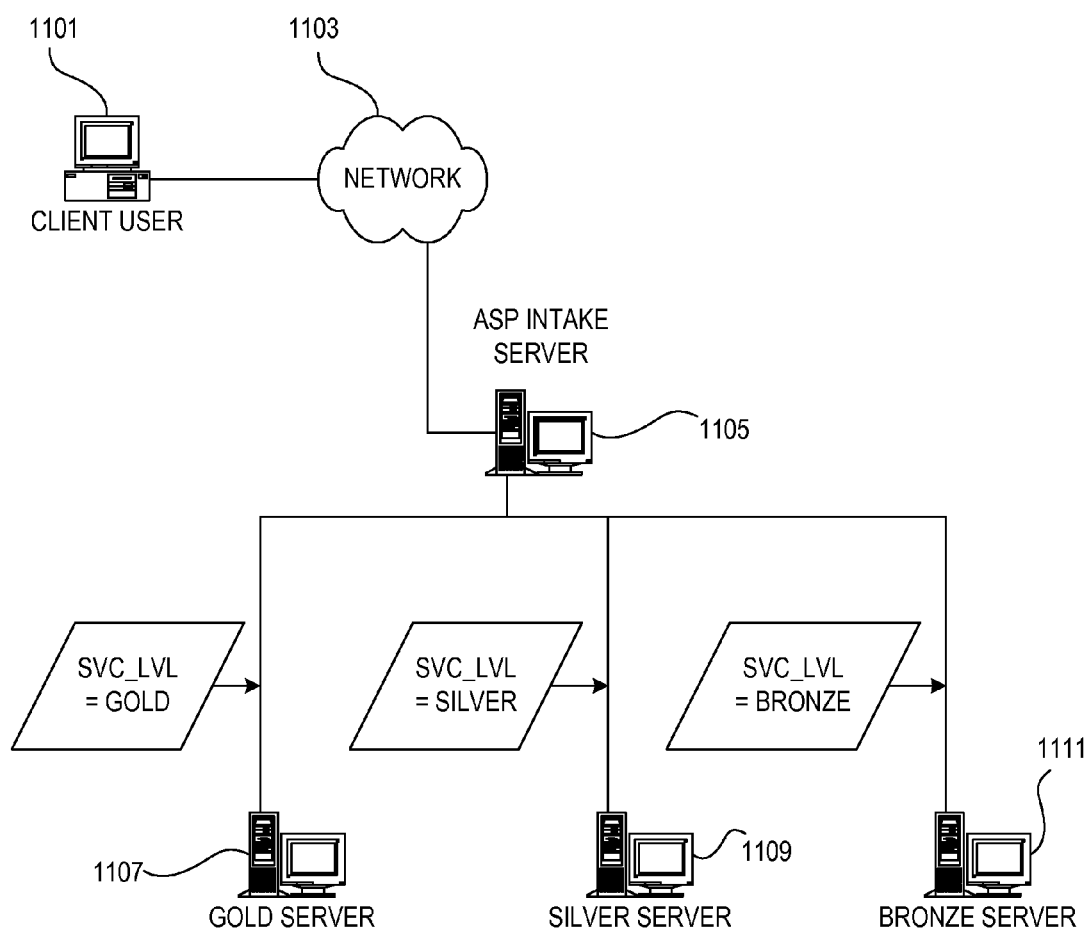
FIG. 11 illustrates network architecture according to an embodiment of the invention.

In another example, with reference to FIG. 11, suppose an application service provider (ASP) provides three levels of service to customers. The ASP may route messages to one of three different servers and/or applications, based on a level of service to which a customer has subscribed. The ASP may define and use a new application header called service_level or the like to indicate a level of service for each customer. The client application may populate the service level field with one of gold, silver, or bronze to indicate the level of service for which the specific customer has paid and/or otherwise subscribed. A master server 1105 may receive all incoming messages from customers 1101 via a network 1103. The master server dispatcher, e.g., VND 103, may then route the incoming customer messages based on the service level. Customers that order gold service may be routed to a fast response server 1107, a server that supports a complete set of services, or other premium-level server. Customers that order silver service may be routed to a mid-speed response server 1109, a server that supports selected services in addition to basic services, or other medium service-level sever. Customers that order bronze service may be routed to a slow response server 1111, a server that supports only basic services, or other low service-level server.

In another example, an application may include a header field named geographic_zone relating to a sending user's geographic location. Routing decisions may then be made based on the sender's physical location, so that messages are sent to a server located closest to the sending user. For instance, in a system that maintains two servers, the device may route a message to a first server in Seattle, Wash. when the geographic location header field indicates the sending user is located in Portland, Oreg., and may route the message to a second server in Chicago, Ill. when the geographic location header field indicates the sending user is located in Detroit, Mich. This avoids sending messages to distant servers when an equivalent server is nearby.

In another example, when a denial of service attack has been launched against one or more machines, a handler may be created that rejects all messages based on a 'credentials' field of each message. The 'credentials' field may or may not be the same as the message's 'from' field. For instance, the 'credentials' field may include a sending user's name, as well as authentication to prove that the sender is who he says he is, whereas the 'from' field may simply include a sender's IP address or logical name. The handler may be configured to accept a message when the message's 'credentials' field contains proper credentials for the sending machine. When a message is rejected, it may be completely ignored, freeing up resources to respond to legitimate messages.

Figure 4:
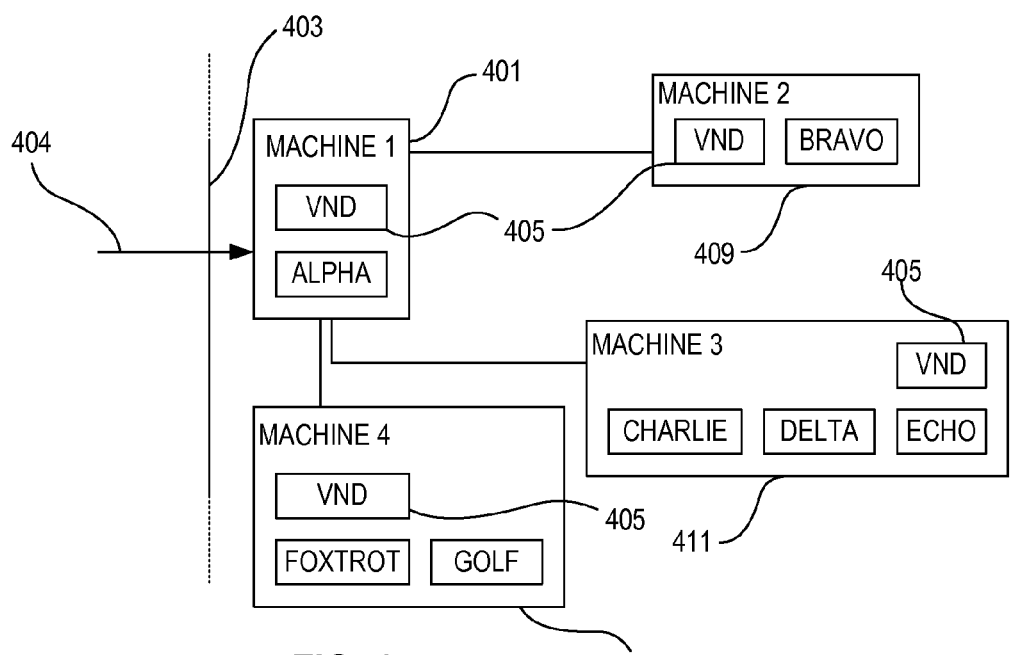
FIG. 4 illustrates a block diagram of a virtual network according to an embodiment of the invention.

In another example, with reference to FIG. 4, a virtual network may be configured to be self-healing. A machine 401 located behind firewall 403 may receive incoming messages on network connection 404. Machine 401 may be connected via a virtual network (i.e., a physical network configured with adaptive dispatchers and transport adapters as discussed herein) to other machines 407, 409, and 411. Each machine 401, 407, 409, and 411 includes VND 405. Each machine 401, 407, 409, and 411 may store one or more virtual locations. That is, machine 1 may store and execute a server known as 'alpha.' Machine 2 may house and store a server known as 'bravo.' Machine 3 may house and store servers known as 'charlie,' 'delta,' and 'echo.' Machine 4 may house and store servers known as 'foxtrot' and 'golf.' Each VND in the virtual network is configured with handlers that map each virtual location to its respective physical machine. For example, when device 401 receives a message directed to virtual location bravo, a virtual location mapping handler in device 401's VND instructs the VND to route the message to machine 2. However, because device 401 is the incoming source at a firewall, VND 405 in machine 1 may be configured with additional handlers to first check all incoming messages for viruses and to perform other security measures.

In order to make the virtual network self-healing, handlers may be created to regularly poll another machine or server to determine its network status. That is, where server 'golf' is a backup server for 'echo,' machine 4 may be configured to poll machine 3 at regular intervals in order to confirm that machine 3, and specifically server 'echo,' is functional. When machine 4 does not receive an acknowledgement from machine 3 (or 'echo') within a specified amount of time, e.g., ten seconds, machine 4 may initiate a failover sequence, whereby machine 4 begins sending routing messages to each machine's VND, indicating to each VND that when a message is received for 'echo' on machine 3, the message should instead be sent to 'golf' on machine 4.

Also using the architecture described in FIG. 4, when a server moves from one machine to another, e.g., from one IP address to a second IP address, the virtual mappings may be updated in each VND without requiring each application program operating on the network to be reconfigured. As application programs send messages to the server, each VND automatically reroutes the message to the server's new location. The virtual mappings may be updated manually, e.g., as a result of a new server being added to the system, or the mappings may be updated automatically, e.g., as a result of an automatic healing or adaptation event as described above. FIG. 12 illustrates a sample virtual mapping table. FIG. 13 illustrates the same table after a first machine hosting the www.foo.com website failed and the system adapted to the failure as described above, rerouting messages to another machine within the redundancy group.

Figure 5:
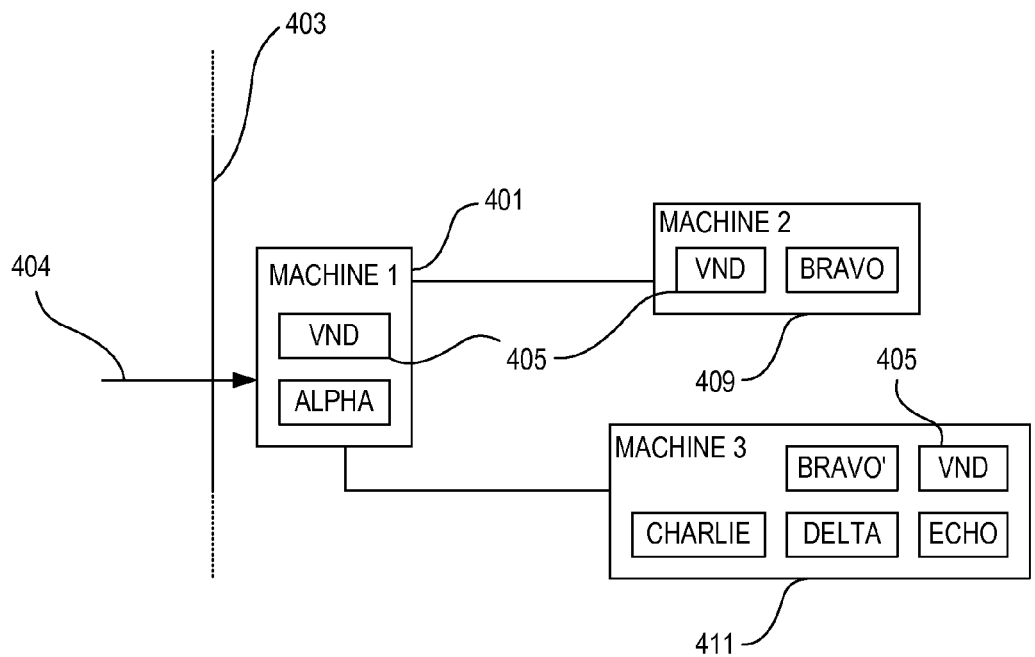
FIG. 5 illustrates a block diagram of a virtual network according to another embodiment of the invention.

With reference to FIG. 5, the virtual mappings also facilitate easy setup and testing of new servers and network applications. For example, server bravo on machine 2 may be a production email server (i.e., it is an email server presently used in the virtual network). The owner of the virtual network may want to test an upgraded email server with new or different features. Generally, in order to test the new server, a user would have to direct his email client to the new server. This may not be inconvenient for a single user, but it may be a major inconvenience to change every user's server name within a large organization when the new server goes live. Using the inventive system, the test server may be installed on machine 3, also named bravo, and referred to as bravo'. Each VND may be configured with a handler that instructs it to route messages for bravo to machine 2. However, the same or a different handler is configured to route messages for bravo to machine 3 when the sender is a predetermined user, e.g., the network administrator that is testing the new server (bravo'). Thus, no reconfiguration of the test user's machine is required. In addition, when the new server bravo' is ready to be put into production, the network mappings may be changed by directing all bravo messages to machine 3, without interrupting any users' email service. Each user will transparently begin using the new email server because the virtual mapping has changed.

Figure 7:
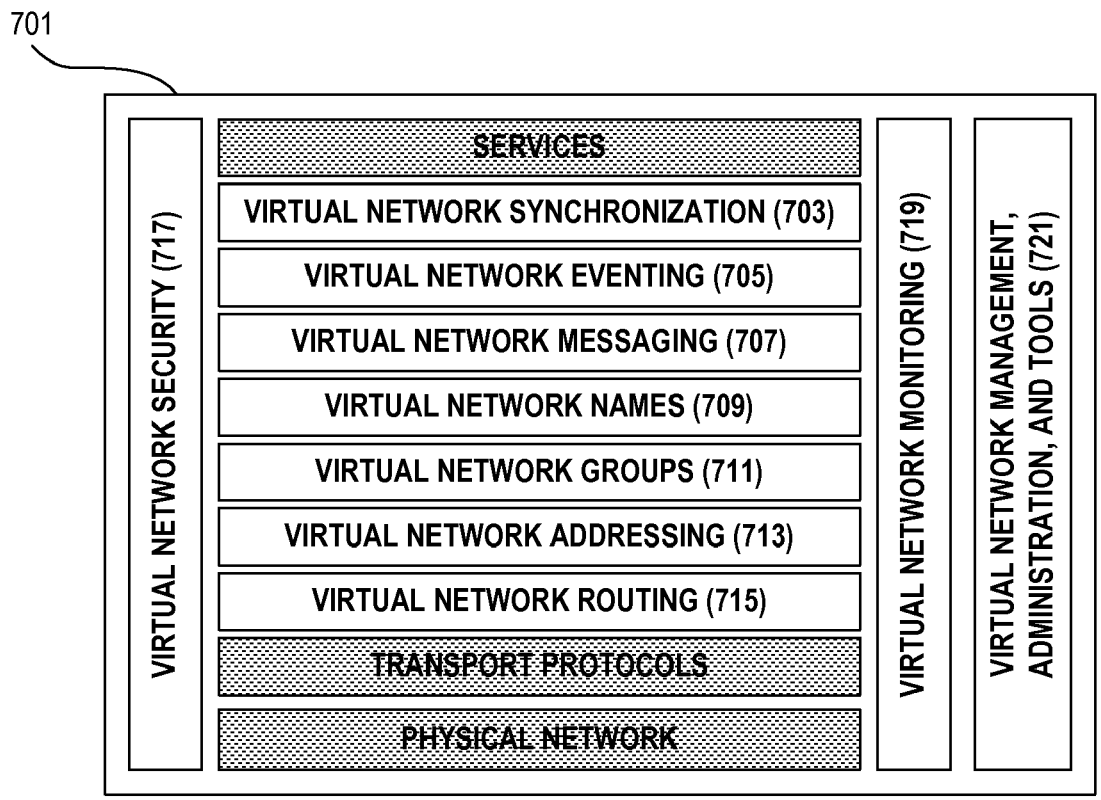
FIG. 7 illustrates a suite of services provided by a virtual network according to an embodiment of the invention.

With reference to FIG. 7, a suite of virtual network services may be provided to ensure that communications and services in the virtual network are secure, adaptable, reliable, self-healing, and platform independent. Virtual network synchronization services 703 ensure that distributed data within the network remains synchronized. Virtual network eventing services 705 create new routing and/or dispatch rules based on the occurrence or non-occurrence of an event. Virtual network messaging services 707 route messages according to virtual names and locations. Virtual network name services 709 provide name resolution services based on any substring of a virtual name. Virtual network group services 711 manage name-mapping tables. Virtual network addressing services 713 perform naming and routing services for fixed-length address names, e.g., IPv6 addresses. However, virtual network addressing services may be used with any flat address space of fixed-size addresses. Virtual network routing services 715 route and dispatch based on dynamic rules in conjunction with dynamic headers using a composable message protocol. Virtual network security services 717 may be provided across all levels of the network to ensure that message contents are secure and authentic. Virtual network management 719 may be performed across all levels, such as managing names, routing/dispatch handlers, eventing, etc. Virtual network monitoring services 721 allow a network administrator to monitor network usage, bandwidth, bottleneck points, and the like, as is presently known in the art.

Figure 9:
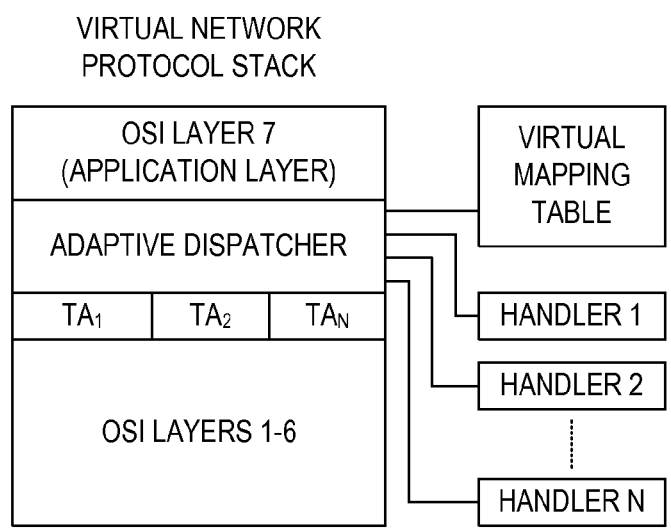
FIG. 9 illustrates a modified OSI seven layer network protocol stack according to an embodiment of the invention.

An embodiment of the invention may be based on a modified version of the seven-level open systems interconnection (OSI) network model, as illustrated in FIG. 9. One protocol stack that may be used with the OSI model is the TCP/IP protocol stack. The invention may insert an additional level of abstraction in the OSI network model, or any other network model, by inserting a layer between the top application layer and the layer immediately below the top application layer. The new layer, referred to as the virtual network (VN) layer, should be consistent across all applications so that the applications can interoperate in a uniform way as defined by the VN layer. A network into which a VN layer has been integrated is referred to as a virtual network. In one embodiment, the VN layer includes a virtual network dispatcher and any necessary transport adapters, routing and dispatching messages based on message handlers and a virtual address mapping table.

Using the above-described architecture, a network may route and dispatch messages based on different message content, on an individual message basis. The invention provides a network protocol that programmers may adapt and configure as needed using the API. Programmers, and programs using the API, may instruct VNDs how to route and dispatch incoming messages. That is, programmers send meta-messages to VNDs, where each meta-message is constructed according to the API and provides one or more routing and/or dispatching instructions.

Figure 8:
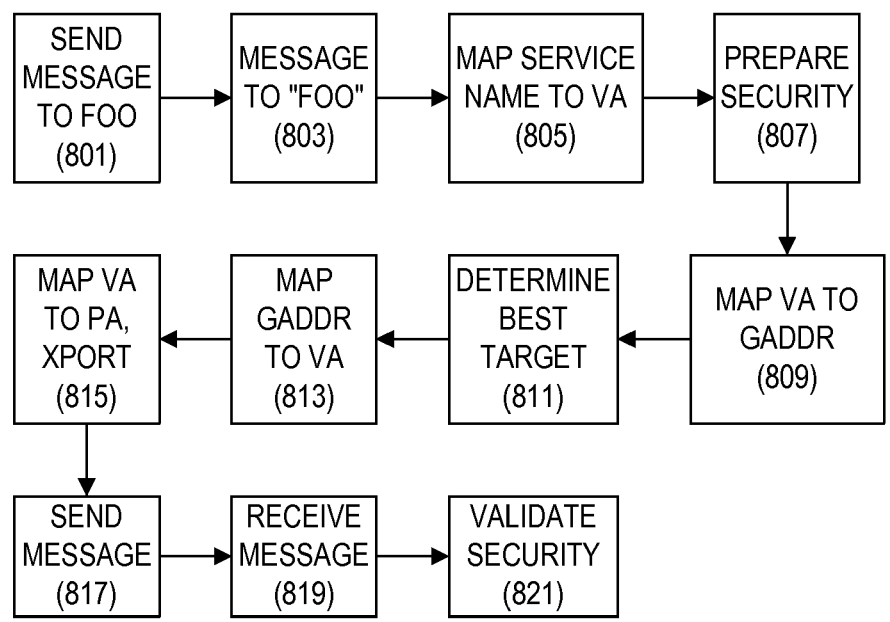
FIG. 8 illustrates a flowchart for performing message delivery according to an embodiment of the invention.

FIG. 8 illustrates a flowchart of a general routing procedure according to an embodiment of the invention. In step 801, a user decides to send a message to a service known as 'foo.' The machine creates the message to service 'foo' in step 803. In step 805, the service name 'foo' is mapped to a virtual address based on a virtual address mapping table. The message is secured as necessary in step 807. In one embodiment, security is performed using SOAP extensions such as those defined by the Web Services Security Language (WS-Security) and/or the Web Services License Language (WS-License). In another embodiment, a transformation is performed on the message to select relevant parts. A digest is computed over the selected parts and encrypted/signed by the sender. Portions of the message might be confidential. In this case they are encrypted using a shared key or a new key which is, in turn, encrypted for the recipient. In step 809, the virtual address is mapped to a group address (GADDR), when applicable. In step 811, the adaptive dispatcher (i.e., a VND) determines the best target and, in step 813, maps the GADDR to a virtual address. In step 815, the virtual address is mapped to a physical address, and, in step 817, the message is sent to the physical address. The recipient machine receives the message in step 819, and validates the security in step 821.

Figure 6:
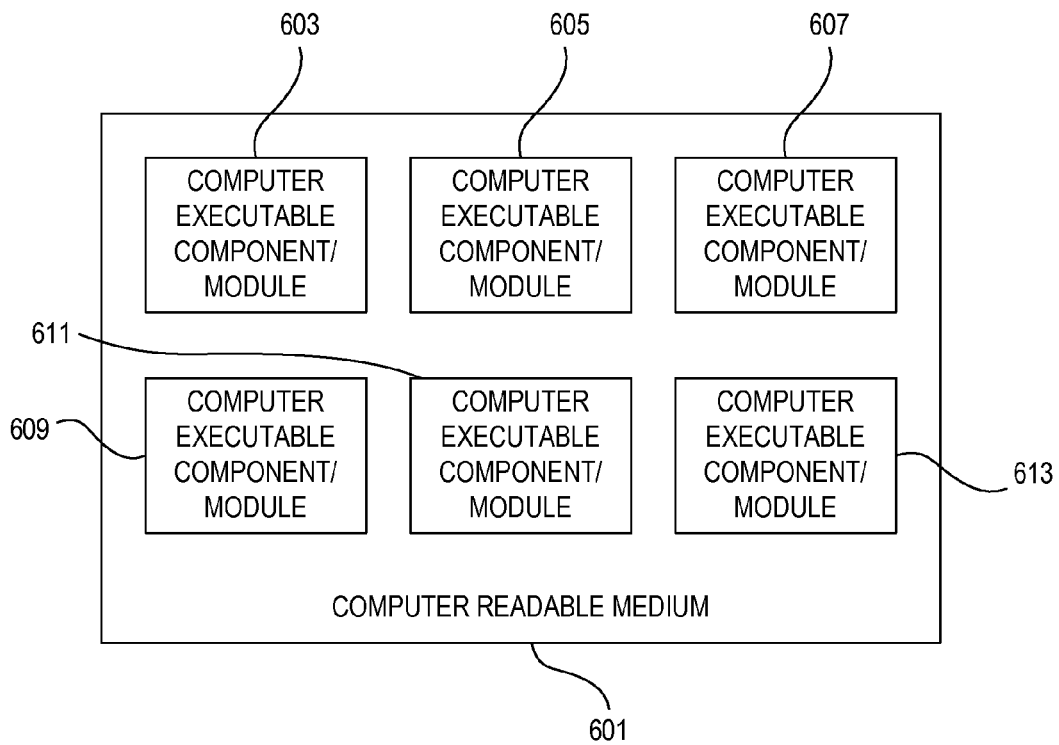
FIG. 6 illustrates a block diagram of a computer readable medium storing computer software according to an embodiment of the invention.

The inventive methods may be embodied as computer readable instructions stored on a computer readable medium such as a floppy disk, CD-ROM, removable storage device, hard disk, system memory, or other data storage medium. Alternatively, the inventive methods may be embodied in a combination of hardware and software, or in only hardware. FIG. 6 illustrates a block diagram of a computer readable medium 601 that may be used in accordance with one or more of the above-described embodiments. The computer readable medium 601 stores computer executable components, or software modules, 603-613. More or fewer software modules may alternatively be used. Each component may be an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings of the present invention.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. An apparatus, comprising:
one or more hardware processors; and
one or more computer readable media storing the following executable components that are implemented when executed by the one or more processors:
a message dispatcher that routes and dispatches a plurality of messages, wherein the message dispatcher routes each of the plurality of messages based on an application level header of the message, the application level header comprising a custom header that is included in the message by the application that sent the message and is not an address field of the message, and wherein the message dispatcher routes a first network message based on a first attribute in the application level header of said first network message, and routes a second network message based on a second attribute, different from said first attribute, in the application level header of said second network message such that the destination of each of the first and second network messages is determined based not on a destination address included in an address field of the message, but the first or second attribute included in the message by the application; and an interface through which one or more application programs communicate with the message dispatcher to define handlers in the message dispatcher for handling messages that include a custom header that contains either the first attribute or the second attribute.

2. The apparatus of claim 1, wherein the message dispatcher comprises a transport independent message dispatcher, and the message dispatcher communicates using a transport independent protocol.

3. The apparatus of claim 1 wherein the message dispatcher routes a first network message that is addressed to a recipient and sent by a first sender, to a first server, and
wherein the message dispatcher routes a second network message that is addressed to the recipient and sent by a second sender, to a second server such that the first and second network messages that are both addressed to the same recipient are routed to different servers.

4. The apparatus of claim 1, wherein the message dispatcher routes messages using a virtual network protocol above a transport layer protocol.

5. The apparatus of claim 4, further comprising a transport adapter to convert messages between the transport layer protocol and the virtual network protocol.

6. A method for routing network messages, comprising the steps of:
receiving, from an application, a first and second network message at a message dispatcher that routes and dispatches messages;
routing the first network message based on a first attribute of the first network message that was included within the data of the first network message by the application, the first attribute not being included in an address field of the first network message;
routing the second network message based on a second attribute, different from said first attribute, of the second network message that was included within the data of the second network message by the application the second attribute not being included in an address field of the second network message such that the destination of each of the first and second network messages is determined based not on a destination address included in an address field of the message, but the first or second attribute included in the message by the application.

7. The method of claim 6, further comprising the steps of:
receiving, at the message dispatcher, instructions from the application comprising a message field and a field condition;
modifying a message handler of the message dispatcher based on the received instructions, wherein the message handler determines where to route messages that include the first or the second attribute.

8. The method of claim 7, wherein the instructions comprises user-input.

9. The method of claim 6, wherein each message is output to a transport adapter that converts the message from a virtual network protocol to a transport protocol.

10. The method of claim 6, wherein the first attribute comprises an application created header.

11. The method of claim 6, wherein the routing of the first and second network messages is determined by one or more message handlers of the message dispatcher.

12. The method of claim 11, further comprising the step of altering a first message handler when a predetermined condition occurs.

13. The method of claim 11, further comprising the step of altering a network message when the message meets a predetermined condition stored in a message handler.

14. The method of claim 6, further comprising:
adding a new message handler to route messages based on a newly created type of message header.

15. The method of claim 6, wherein either of the first or second attributes correspond to a geographic location of the sender of the message.

16. The method of claim 6, wherein either of the first or second attributes correspond to a class of service of the sender of the message.

17. A computer network architecture comprising:
a plurality of data processing devices, that each include one or more processors and system memory, interconnected via a computer network, each data processing device further comprising:
a virtual message dispatcher, implemented as one or more software modules, one or more hardware modules, or a combination of software and hardware modules, that routes messages to intended destinations and dispatches messages to appropriate applications at their intended destination, wherein each message is routed based at least in part on a non-address portion of the message's contents, said routing instructions defined by one or more stored message handlers such that the destination of each message is determined based not on a destination address included in an address field of the message, but the non-address portion of the message's contents; and
an interface through which OSI layer 7 application programs communicate with the message dispatcher to define the one or more message handlers, wherein the virtual message dispatcher comprises a transport adapter for converting messages between a virtual network protocol used by network applications and a transport protocol used by the computer network, and wherein the virtual message dispatcher is configurable for use with a second transport protocol by adding a second transport adapter that converts messages between the second transport protocol and the virtual network protocol, without requiring any network applications to be reconfigured for use with the second transport protocol.

18. The computer network of claim 17, wherein a first message handler defines routing instructions based on a class of service.

* * * * *